(12) United States Patent
Keesara et al.

(10) Patent No.: US 8,949,385 B2
(45) Date of Patent: Feb. 3, 2015

(54) METHOD AND APPARATUS FOR RESOLVING CONFLICTING UNICAST ADVERTISEMENTS IN A TRANSPORT NETWORK

(75) Inventors: Srikanth Keesara, Tewksbury, MA (US); Xiaolan Zhou, Carlisle, MA (US)

(73) Assignee: Avaya, Inc., Basking Ridge, NJ (US)

( * ) Notice: Subject to any disclaimer, the term of this patent is extended or adjusted under 35 U.S.C. 154(b) by 489 days.

(21) Appl. No.: 13/246,110

(22) Filed: Sep. 27, 2011

(65) Prior Publication Data

US 2013/0080602 A1    Mar. 28, 2013

(51) Int. Cl.
*H04L 29/12* (2006.01)
*H04L 12/46* (2006.01)
*H04L 12/721* (2013.01)
*H04L 12/24* (2006.01)
*H04L 29/00* (2006.01)

(52) U.S. Cl.
CPC ........ *H04L 12/4625* (2013.01); *H04L 61/6022* (2013.01); *H04L 12/4641* (2013.01); *H04L 45/66* (2013.01); *H04L 12/4633* (2013.01); *H04L 61/20* (2013.01); *H04L 61/3005* (2013.01); *H04L 41/0681* (2013.01); *H04L 29/00* (2013.01)
USPC ........... 709/220; 709/223; 709/221; 370/241; 370/254

(58) Field of Classification Search
CPC .................................. H04L 61/2046
USPC ........................................................ 709/220
See application file for complete search history.

(56) References Cited

U.S. PATENT DOCUMENTS

| 2007/0097992 | A1* | 5/2007 | Singh et al. | 370/395.54 |
|---|---|---|---|---|
| 2008/0285459 | A1* | 11/2008 | Diab et al. | 370/238 |
| 2010/0211542 | A1* | 8/2010 | Starbuck | 707/610 |
| 2010/0309789 | A1* | 12/2010 | Previdi et al. | 370/238 |
| 2011/0164505 | A1* | 7/2011 | Salam et al. | 370/241 |
| 2012/0182862 | A1* | 7/2012 | Cirkovic | 370/220 |

* cited by examiner

*Primary Examiner* — Douglas Blair
*Assistant Examiner* — Joseph M Cousins
(74) *Attorney, Agent, or Firm* — Anderson Gorecki & Rouille LLP

(57) ABSTRACT

A method, apparatus and computer program product for resolving conflicting unicast advertisements in transport network is presented. A particular Backbone Virtual Local Area Network (BVLAN) as a first BVLAN (BVLAN1) on a first network device in a transport network. The first network device receives a first message from a second network device advertising a first Backbone Media Access Channel (BMAC) on a first BVLAN (BMAC1,BVLAN1). The first network device receives a second message from a third network device advertising the (BMAC1,BVLAN1). The (BMAC1,BVLAN1) is assigned to the device of the second network device and the third network device having a lower Identifier (ID) value, wherein the ID value comprises one of the group comprising an Intermediate System to Intermediate System (ISIS) system ID and a Shortest Path Bridging (SPB) bridge ID.

20 Claims, 5 Drawing Sheets

METHOD AND APPARATUS FOR RESOLVING CONFLICTING UNICAST ADVERTISEMENTS IN A TRANSPORT NETWORK

BACKGROUND

In a computer network, network switching devices (switches) interconnect to form a path for transmitting information between an originator and a recipient. A routing mechanism, or protocol, defines switching logic that forwards the transmitted information in the form of packets between the switches as a series of "hops" along a path. At each switch, the switching logic identifies the next switch, or hop, in the path using an identifier such as a MAC address. Shortest Path Bridging (SPB) is a routing mechanism having switching logic such that each switch advertises the nodes it knows about to all the other switches, and eventually all the switches in the network have the same picture of the network and therefore can forward frames to the next hop in the shortest path.

An access network provides connectivity to end stations that provide computing services to users. Typically, an end station communicates with another end station at a remote access network, which may be another user, a server, a storage device, or a gateway to such entities or services. A transport network provides connectivity and message traffic transport between the access networks. The access network is therefore supporting a number of end users via end stations in a corporate site, local area network, or other campus or enterprise setting. Since an interruption of connection between the access network and transport network may inhibit operation of the access network, and hence all end stations connected to it, it is beneficial to provide an alternate mechanism for throughput from the transport to the access network. Configurations disclosed herein provide multiple connections via a plurality of network devices, such as a network switch, from the transport network to the access network. In an example arrangement shown below, a transport network employs a dual homing arrangement to the access network to provide connectivity from multiple network switches.

Dual homing is a mechanism by which an access network connects to and uses a pair of devices in the transport network as if it were connecting to a single device. The two devices (network switches) in the transport network exchange information between them which allow them to present the access network to the rest of the transport network as if the access network was connected to a single device in the transport network. Failure of the connection of one of the transport devices to the access network or even the complete failure of one of the transport devices will not cause loss of connectivity between the access network and the transport network. The access network therefore exhibits dual homed access, which is an access network that uses dual homing to connect to a pair of transport devices, and the transport devices define a dual homed edge, or a pair of partner devices, in the transport network that provide dual homing service to an access network. The disclosed dual homed access configurations, routing logic and deployment are applicable to other multiple homed schemes as well.

In the examples disclosed herein, the transport network is an SPB network. SPB is defined in IEEE-802.1aq: IEEE standard for Shortest Path Bridging, and operates in conjunction with IEEE-802.1ah: IEEE standard for Provider Backbone Bridging, sometimes referred to as Mac-in-Mac encapsulation (SPBM). Shortest Path Bridging (SPB, SPBM) technology is being adopted in Ethernet based data networks to enable Layer-2 and Layer-3 network virtualization. These networks are expected to continue to deliver business critical services even when a variety of network faults occur (or when maintenance operations are performed on the network). Both SPB and SPBM forward packets on shortest path trees with minimum path cost as a first order tie-breaker, where for any pair of nodes A and B, the unicast path for A to B is the exact reverse of the path from B to A (reverse path congruency), and all multicast traffic between the two nodes follows the unicast path (multicast and unicast congruency). These are extensions to fundamental Ethernet forwarding properties in IEEE bridged networks. SPB technology allows a network administrator to easily form mesh networks that distribute load more evenly across the network topology since it can mitigate bottlenecks at core links for traffic that only needs to go from one distribution switch to another.

SUMMARY

Conventional mechanisms such as those explained above suffer from a variety of deficiencies. In a transport network, a device may receive the same Backbone Virtual Local Area Network, Backbone Media Access Channel (BVLAN, BMAC) information from two devices which causes a conflict when constructing/updating a forwarding table within the device. There is no defined way to resolve this conflicting information. The device receiving the conflicting messages has to resolve this conflict in a repeatable manner that results in a useful result.

When connecting an access network to an SPB network it is often desirable to connect the access network to more than one device in the SPB network acting as a transport network. This provides a resilient connection by protecting against the failure of any single SPB device that the access network is connected to. Dual Homing (connecting to two SPB devices) is a fairly popular option. At a high level some of the relevant aspects of conventional dual-homing scenarios are discussed below.

A pair of SPB devices (node X and node Y) supporting Dual-Homing share a Virtual Backbone Multiple Access Channel (BMAC) using two Backbone Virtual Local Area Networks (VLANs). In this environment, each SPB device is assigned a separate BVLAN. When both nodes (X and Y) are up, each of the two nodes advertise the Virtual BMAC only on its assigned BVLAN. This allows the SPB network to unambiguously assign the (BVLAN, Virtual BMAC) records on each of the two BVLANs—one each to node X and to node Y.

When one of the devices fails (for example node X)—the other device (node Y) detects the failure and now advertises the Virtual BMAC on both BVLANs. When the failed device (node X) comes back up, the device that is already up (node Y) detects it and reverts back to advertising Virtual BMAC only on its assigned BVLAN. The device that is coming up (node X) has to wait until it has verified that the other device (node Y) has withdrawn the Virtual BMAC on its BVLAN before itself advertising it. This is to ensure that both devices do not advertise the same (BVLAN, Virtual BMAC) combination at the same time.

While this allows the network to achieve fairly decent resiliency for node failure and recovery scenarios—the traffic loss in these scenarios is at least the amount of time that the surviving node takes to detect that the other node either went down or has just come back up. Also the state machines required to takeover/relinquish the Virtual BMAC are complex.

Embodiments of the invention significantly overcome such deficiencies and provide mechanisms and techniques that use a BVLAN and ISIS system-id (or SPB Bridge-Id) based tie-breaker in order to resolve conflicting advertisements.

In a particular embodiment of a method for resolving conflicting unicast advertisements in a transport network, the method includes designating a particular Backbone Virtual Local Area Network (BVLAN) as a first BVLAN (BVLAN1) on a first network device in a transport network and receiving, at the first network device, a first message from a second network device advertising a first Backbone Media Access Channel (BMAC) on a first BVLAN (BMAC1,BVLAN1). The method further includes receiving, at the first network device, a second message from a third network device advertising the (BMAC1,BVLAN1) and detecting a conflict due to the (BMAC1,BVLAN1) being advertised by the second network device and the third network device. The method additionally includes recognizing that the particular BVLAN is the BVLAN1, and applying the tie-breaker rule which comprises assigning the (BMAC1,BVLAN1) to the device of the second network device and the third network device having a lower Identifier (ID) value.

In certain embodiments the above method may further include designating a second particular BVLAN as a second BVLAN (BVLAN2) on the first network device and receiving, at the first network device, a third message from a fourth network device advertising a second BMAC on a second BVLAN (BMAC2,BVLAN2). Further still the method includes receiving, at the first network device, a fourth message from a fifth network device advertising the (BMAC2, BVLAN2) and detecting a conflict due to the (BMAC2,BVLAN2) being advertised by the fourth network device and the fifth network device. Additionally the method includes recognizing that the second particular BVLAN is the BVLAN2, and applying the tie-breaker rule which comprises assigning the (BMAC2,BVLAN2) to the device of the fourth network device and the fifth network device having a higher Identifier (ID) value. The identifier is either the Intermediate System to Intermediate System (ISIS) ID or the Shortest Path Bridging (SPB) bridge ID.

Further, when used in a dual homed network the method provides a technique wherein when one of the dual homed devices fail, the surviving device automatically is assigned the virtual BMAC since both nodes receive the advertisement. When the failed device recovers, the VBMAC will get assigned to the proper BVLAN by way of the tie-breaker rule application.

Other embodiments include a computer readable medium having computer readable code thereon for resolving conflicting unicast advertisements in a transport network. The computer readable medium includes instructions for designating a particular Backbone Virtual Local Area Network (BVLAN) as a first BVLAN (BVLAN1) on a first network device in a transport network and receiving, at the first network device, a first message from a second network device advertising a first Backbone Media Access Channel (BMAC) on a first BVLAN (BMAC1,BVLAN1). The computer readable medium further includes instructions for receiving, at the first network device, a second message from a third network device advertising the (BMAC1,BVLAN1) and detecting a conflict due to the (BMAC1,BVLAN1) being advertised by the second network device and the third network device. The computer readable medium additionally includes instructions for recognizing that the particular BVLAN is the BVLAN1, and applying the tie-breaker rule which comprises assigning the (BMAC1,BVLAN1) to the device of the second network device and the third network device having a lower Identifier (ID) value.

In certain embodiments the above described computer readable medium may further include instructions for designating a second particular BVLAN as a second BVLAN (BVLAN2) on the first network device and receiving, at the first network device, a third message from a fourth network device advertising a second BMAC on a second BVLAN (BMAC2,BVLAN2). Further still the computer readable medium includes instructions for receiving, at the first network device, a fourth message from a fifth network device advertising the (BMAC2,BVLAN2) and detecting a conflict due to the (BMAC2,BVLAN2) being advertised by the fourth network device and the fifth network device. Additionally the computer readable medium includes instructions for recognizing that the second particular BVLAN is the BVLAN2, and applying the tie-breaker rule which comprises assigning the (BMAC2,BVLAN2) to the device of the fourth network device and the fifth network device having a higher Identifier (ID) value. The identifier is either the Intermediate System to Intermediate System (ISIS) ID or the Shortest Path Bridging (SPB) bridge ID.

Further, when used in a dual homed network the computer readable medium provides instructions for a technique wherein when one of the dual homed devices fail, the surviving device automatically is assigned the virtual BMAC since both nodes receive the advertisement. When the failed device recovers, the VBMAC will get assigned to the proper BVLAN by way of the tie-breaker rule application.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides resolving conflicting unicast advertisements in a transport network as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations resolving conflicting unicast advertisements in a transport network as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Basking Ridge, N.J.

Note that each of the different features, techniques, configurations, etc. discussed in this disclosure can be executed independently or in combination. Accordingly, the present invention can be embodied and viewed in many different ways. Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

The embodiments set forth below represent the necessary information to enable those skilled in the art to practice the invention and illustrate the best mode of practicing embodiments of the invention. Upon reading the following description in light of the accompanying figures, those skilled in the art will understand the concepts of the invention and recognize applications of these concepts not particularly addressed herein. It should be understood that these concepts and applications fall within the scope of the disclosure and the accompanying claims.

Figure 1:
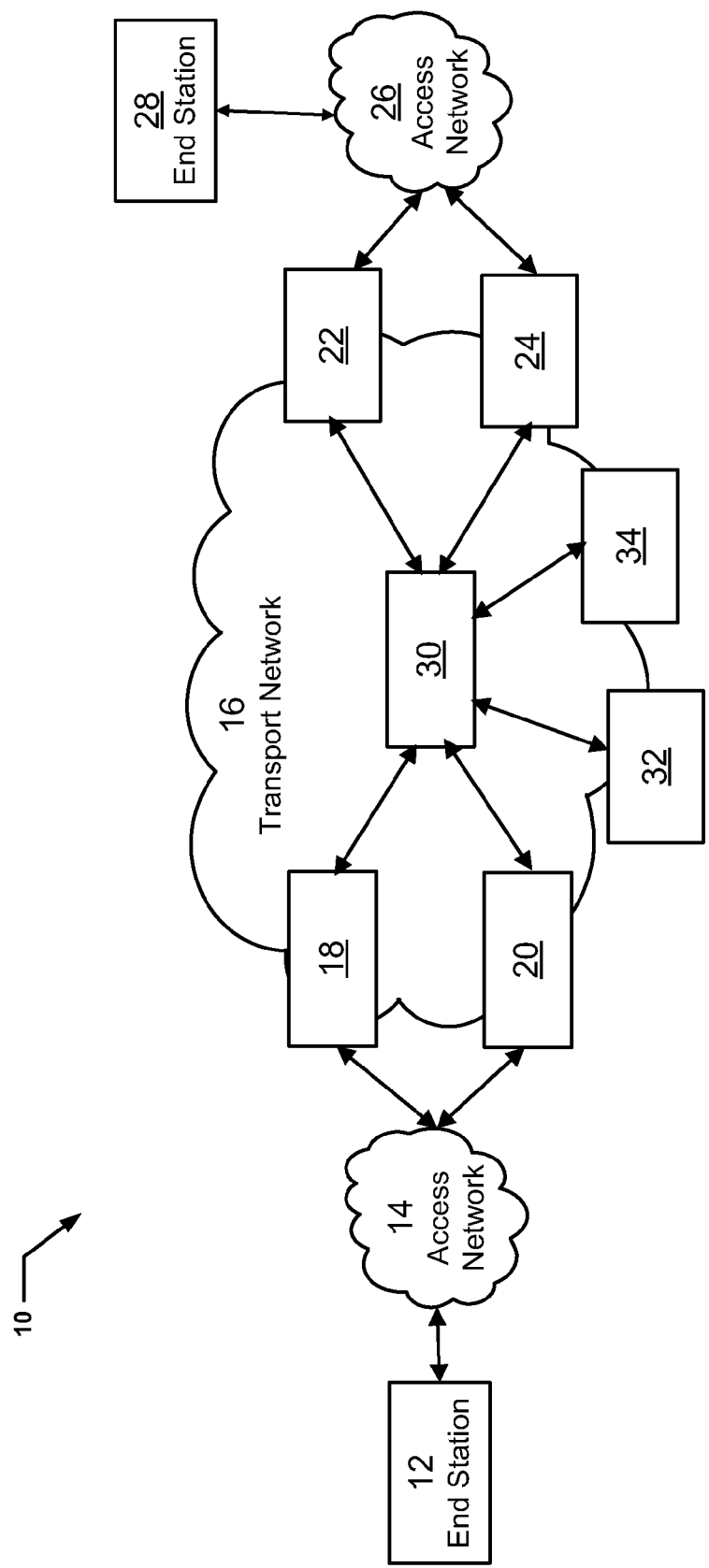
FIG. 1 is a diagram of a network for resolving conflicting unicast advertisements in a transport network in accordance with embodiments of the invention.

FIG. 1 illustrates an environment 10 wherein a first access network 14 and a second access network 28 are interconnected by way of a transport network 16. Transport network 16 in this example is a Shortest Path Bridging (SPB) network. The transport network 16 includes a group of network devices, 18, 20, 22, 24, 30, 32 and 34.

SPB combines an Ethernet data path (either IEEE 802.1Q in the case of SPB, or Provider Backbone Bridges (PBBs) IEEE 802.1ah in the case of SPBM) with an IS-IS link state control protocol running between Shortest Path bridges (NNI links). The link state protocol is used to discover and advertise the network topology and compute shortest path trees from all bridges in the SPB Region. In SPBM, the Backbone MAC (B-MAC) addresses of the participating nodes and also the service membership information for interfaces to non-participating devices (UNI ports) is distributed. Topology data is the input to a calculation engine which computes symmetric shortest path trees based on minimum cost from each participating node to all other participating nodes. In SPBV these trees provide a shortest path tree where individual MAC address can be learned and Group Address membership can be distributed. In SPBM the shortest path trees are then used to populate forwarding tables for each participating node's individual B-MAC addresses and for Group addresses; Group multicast trees are sub trees of the default shortest path tree formed by (Source, Group) pairing. Depending on the topology several different equal cost multi path trees are possible and SPB supports multiple algorithms per IS-IS instance.

In SPB as with other link state based protocols, the computations are done in a distributed fashion. Each node computes the Ethernet compliant forwarding behavior independently based on a normally synchronized common view of the network (at scales of about 1000 nodes or less) and the service attachment points (UNI ports). Ethernet filtering Database (or forwarding) tables are populated locally to independently and deterministically implement its portion of the network forwarding behavior.

It is possible for data packets from end station 12, destined for end station 28, to arrive at either edge device 18 or 20 from access network 14. Edge device 18, from a network point of view, identifies data received from access network 14 as access network 14, without respect to multiple access points or end stations within access network 14. Note that there can be several access networks connected to a given transport device. For clarity and understanding embodiments, the figures are simplified by showing a single access network connected to a given transport device.

In the transport network 16, a device may receive the same Backbone Virtual Local Area Network, Backbone Media Access Channel (BVLAN, BMAC) information from two devices. There is no defined way to resolve this conflicting information. The device has to resolve this conflict in a repeatable manner that results in a useful result.

In order to resolve this conflict, a tie-breaker is applied. The tie-breaker assigns the BMAC to the device having a lower identifier on the first BVLAN and assigns the BMAC to the device having a higher identifier on the second BVLAN. The identifier is either the Intermediate System to Intermediate System (ISIS) ID or the Shortest Path Bridging (SPB) bridge ID.

For example, in environment 10 of FIG. 1, a particular Backbone Virtual Local Area Network (BVLAN) is designated as a first BVLAN (BVLAN1) on network device 30 in the transport network 16. Device 30 may receive a first message (e.g., an advertisement of (BMAC1,BVLAN1)) from device 18 and also receive the same (BMAC1,BVLAN1) advertisement from device 20. Device 30 detects a conflict due to the same (BMAC1,BVLAN1) being advertised by device 18 and also device 20. Device 30 recognizes that the particular BVLAN is BVLAN1.

In order for device 30 to construct an accurate forwarding table, the conflict of having the same advertisement from two different devices must be resolved. In this example, the tie-breaker is applied. This involves assigning the (BMAC1, BVLAN1) to the device of network device 18 and network device 20 having a lower Identifier (ID) value.

Further, a second particular Backbone Virtual Local Area Network (BVLAN) is designated as a second BVLAN (BVLAN2) on network device 30 in the transport network 16. Device 30 may receive a message (e.g., an advertisement of (BMAC2,BVLAN2)) from device 32 and also receive the same (BMAC2,BVLAN2) advertisement from device 34. Device 30 detects a conflict due to the same (BMAC2,BVLAN2) being advertised by device 32 and also device 34. Device 30 recognizes that the particular BVLAN is BVLAN2.

In order for device 30 to construct an accurate forwarding table, the conflict of having the same advertisement from two different devices must be resolved. In this example, the tie-breaker is applied. This involves assigning the (BMAC2, BVLAN2) to the device of network device 32 and network device 34 having a lower Identifier (ID) value. The ID value comprises one of the group comprising an Intermediate System to Intermediate System (ISIS) system ID and a Shortest Path Bridging (SPB) bridge ID.

It is important to note that the tie-breaker used here is different then conventional tie-breakers which are used to resolve node to node ties base don lowest cost.

Access networks can be structured as single homed access or dual homed access. Single homing identifies an access network that connects to a single device (physical or logical) at the edge of a transport network. Dual homing identifies an access network that connects to at least a pair of transport devices (physical or logical). A dual homed edge then includes that pair of devices (switching devices) in the transport network that provide dual homing service to an access network, that is, the access network has a dual homed connection to the transport network. Thus, dual homing is a mechanism by which a given access network connects to, and uses, a pair of devices in the transport network as if the given access network were connected to a single device. The two devices in the transport network exchange information between each other, which enables the pair of devices to present the access network to the rest of the transport network as if the access network was connected to a single device in the transport network. Failure of the connection of one of the paired transport devices to the access network, or even the complete failure of one of the transport devices, will not cause loss of connectivity between this given access network and any other access network. In other words, dual homed access provides redundancy, load balancing, and fault protection. Many networks used dual homed access networks. A dual homed access network is almost always used with important or priority networks. Such use is especially demanded with networks in which a failure of a transport device, even for a relatively small period, can result in significant losses.

Access network 14 includes end station 12. If end station 12 initiates transmission of a packet to end station 28, access network 14, having dual homed access, can decide whether to transmit the packet via transport device 18 or transport device 20. Access network 14 can split traffic between transport device 18 and transport device 20 depending on load balancing decisions.

In conventional dual homed networks, a Shared Virtual BMAC or Virtual BMAC is a single BMAC that is shared by two edge devices that are part of a Dual homed SPBM Edge. The ownership of this BMAC is split between the BEBs wherein a Primary BEB owns the Virtual BMAC on the Primary BVLAN and a Secondary BEB owns the Virtual BMAC on the secondary BVLAN.

SPB nodes that support dual homing advertise their shared Virtual BMAC on both the BVLANs always and do not withdraw or add (BVLAN, Virtual BMAC) advertisements when their partner node fails or recovers. The resulting conflict where the same (BVLAN, Virtual BMAC) pairs are advertised by two different nodes is resolved by using an unambiguous tie-breaker rule. The tie-breaker rule used is that the Virtual BMAC is assigned to the device with the lower ISIS system-id (or the SPB Bridge-Id) on one BVLAN and the Virtual BMAC is assigned to the device with the higher ISIS system-id (or the SPB Bridge-Id) on the other BVLAN.

This rule can be applied by all the devices in the SPB network and will produce an identical result on all the nodes. When both nodes in a dual homed network are up, use of the tie-breaker results each node in the Dual Homing pair being assigned the Virtual BMAC on one of the BVLANs. This is possible since the ISIS system-id and the SPB Bridge-Id is unique for each node in the network. When one of the dual homed devices fails, the Virtual BMAC gets assigned automatically to other surviving node, since it is always advertising the Virtual BMAC on both BVLANs. When the failed device recovers, the Virtual BMAC will automatically go back to the recovered node on one of the BVLANs, since it will come up advertising the Virtual BMAC on both BVLANs and the tie-breaker rule will be applies, as described above. State machine implementations are simpler since the nodes do not have to takeover or release Virtual BMAC under failure or recovery scenarios. This is because they always advertise the Virtual BMAC on both BVLANs.

Figure 2A:
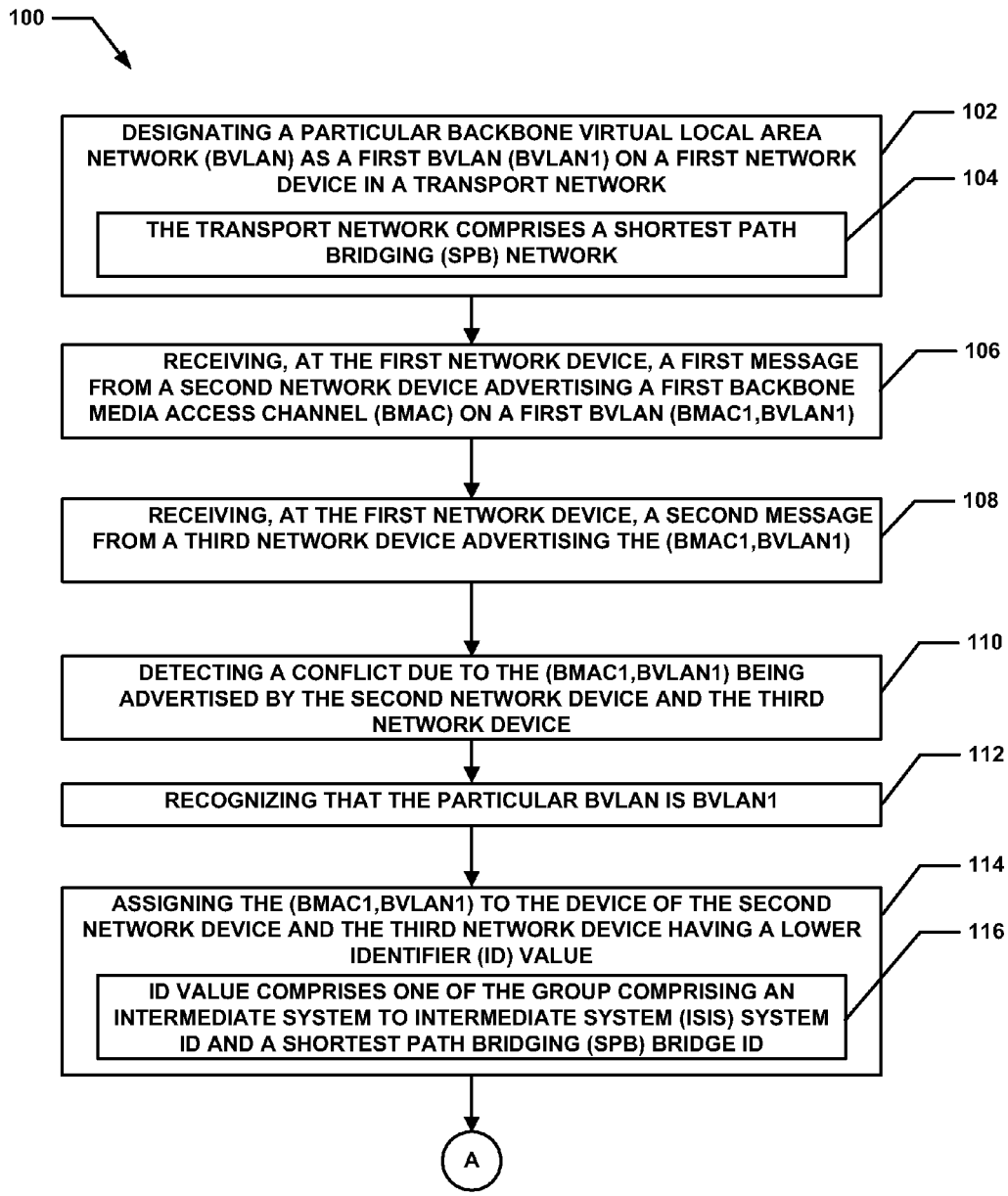
FIGS. 2A-2C are a flow diagram of a particular embodiment of a method for resolving conflicting unicast advertisements in a transport network in accordance with embodiments of the invention.
Figure 2B:
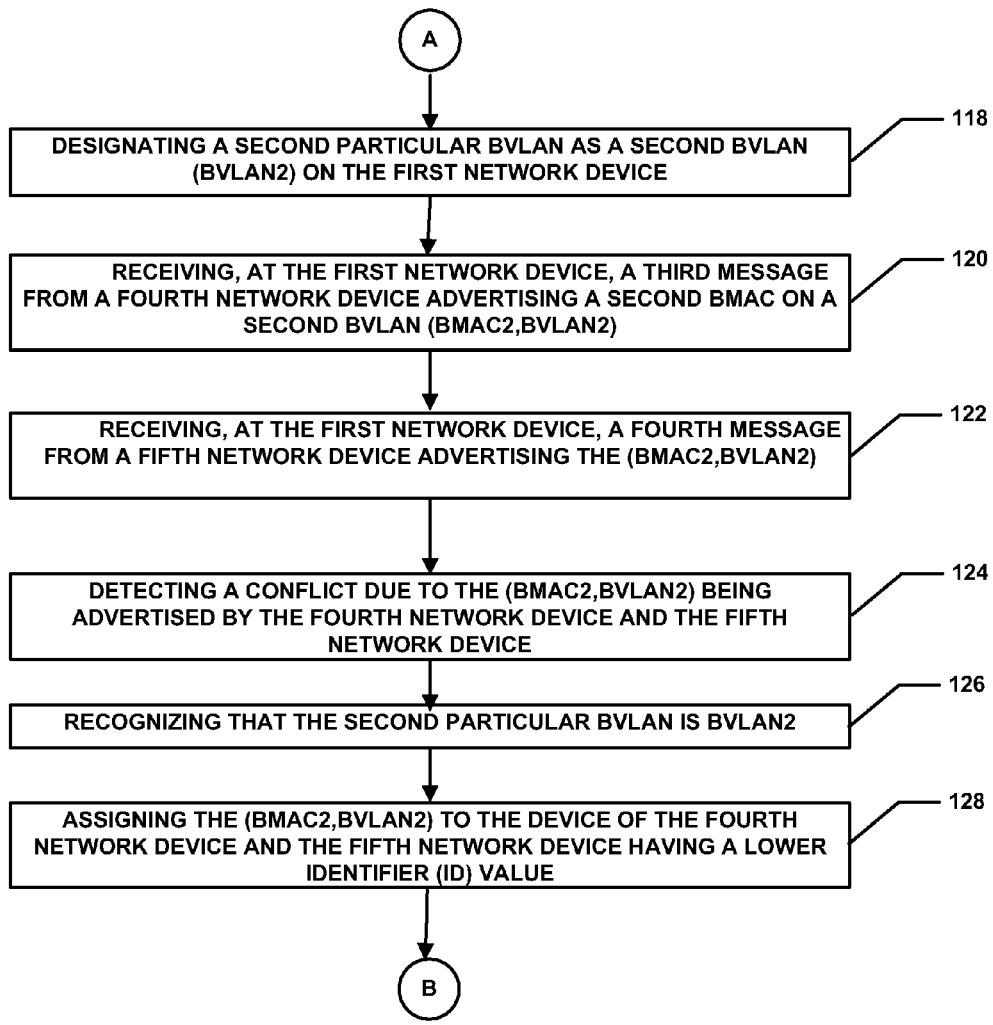
Figure 2C:
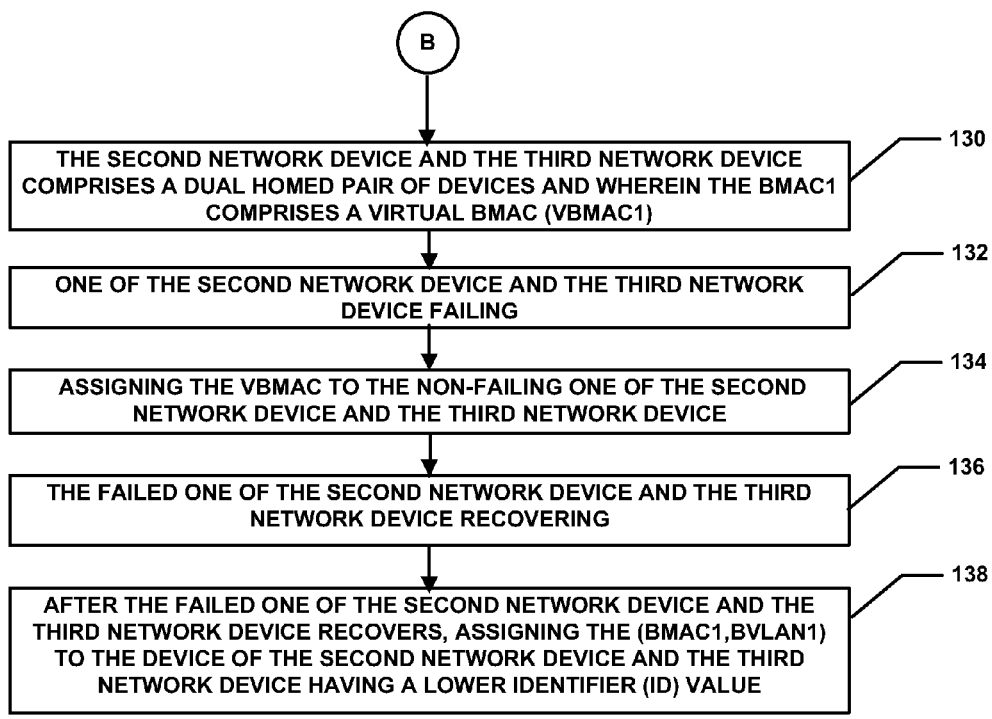

Referring now to FIGS. 2A-2C, a flow chart of a particular embodiment of the presently disclosed method for resolving conflicting unicast advertisements in a transport network is depicted. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Method 100 begins with processing block 102 which discloses designating a particular Backbone Virtual Local Area Network (BVLAN) as a first BVLAN (BVLAN1) on a first network device in a transport network. As shown in processing block 104, the transport network comprises a Shortest Path Bridging (SPB) network.

Processing block 106 states receiving, at the first network device, a first message from a second network device advertising a first Backbone Media Access Channel (BMAC) on a first BVLAN (BMAC1,BVLAN1). Processing block 108 recites receiving, at the first network device, a second message from a third network device advertising the (BMAC1, BVLAN1);

Processing block 110 discloses detecting a conflict due to the (BMAC1,BVLAN1) being advertised by the second network device and the third network device and processing block 112 states recognizing that the particular BVLAN is the BVLAN1.

Processing block 114 recites assigning the (BMAC1,BVLAN1) to the device of the second network device and the third network device having a lower Identifier (ID) value. This step is the application of the tie-breaker rule used to resolve the conflict such that forwarding tables can be properly processed. As shown in processing block 116, the ID value comprises one of the group comprising an Intermediate System to Intermediate System (ISIS) system ID and a Shortest Path Bridging (SPB) bridge ID.

Processing continues with processing block 118 which discloses designating a second particular BVLAN as a second BVLAN (BVLAN2) on the first network device. Processing block 120 states receiving, at the first network device, a third message from a fourth network device advertising a second BMAC on a second BVLAN (BMAC2,BVLAN2), and with processing block 122 which shows receiving, at the first network device, a fourth message from a fifth network device advertising the (BMAC2,BVLAN2).

Processing block 124 states detecting a conflict due to the (BMAC2,BVLAN2) being advertised by the fourth network device and the fifth network device, while processing block 126 discloses recognizing that the second particular BVLAN is the BVLAN2.

Processing block 128 recites assigning the (BMAC2,BVLAN2) to the device of the fourth network device and the fifth network device having a higher Identifier (ID) value. This step is also the application of the tie-breaker rule used to resolve the conflict such that forwarding tables can be properly processed. As discussed above the ID value comprises one of the group comprising an Intermediate System to Intermediate System (ISIS) system ID and a Shortest Path Bridging (SPB) bridge ID.

Referring now to processing block 130, in a particular embodiment the second network device and the third network device comprises a dual homed pair of devices and wherein the BMAC comprises a Virtual BMAC (VBMAC). When both nodes in a dual homed network are up, use of the tie-breaker results each node in the Dual Homing pair being assigned the Virtual BMAC on one of the BVLANs. This is possible since the ISIS system-id and the SPB Bridge-Id is unique for each node in the network.

Processing block 132 discloses one of the second network device and the third network device failing. Processing block 134 states assigning the VBMAC1 to the non-failing one of the second network device and the third network device. When one of the dual homed devices fails, the Virtual BMAC gets assigned automatically to the other surviving node, since it is always advertising the Virtual BMAC on both BVLANs.

Processing block 136 recites the failed one of the second network device and the third network device recovering. Processing block 138 discloses after the failed one of the second network device and the third network device recovers, applying the tie-breaker. When the failed device recovers, the Virtual BMAC will automatically go back to the recovered node on one of the BVLANs, since it will come up advertising the Virtual BMAC on both BVLANs.

Figure 3:
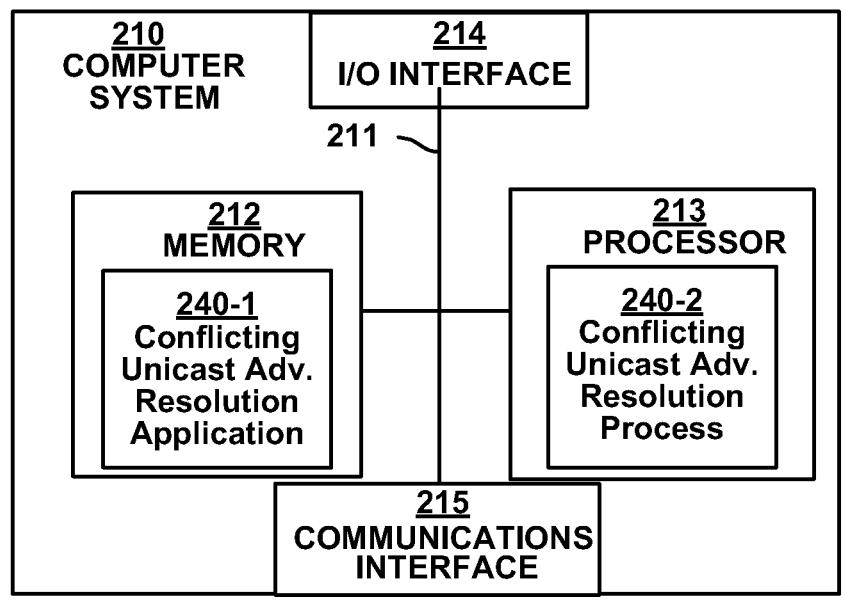
FIG. 3 illustrates an example computer system architecture for a computer system that resolves conflicting unicast advertisements in a transport network in accordance with embodiments of the invention.

FIG. 3 is a block diagram illustrating example architecture of a computer system (e.g., a network device) 210 that executes, runs, interprets, operates or otherwise performs a unicast advertisement conflict resolution operating application 240-1 and unicast advertisement conflict resolution operating process 240-2 suitable for use in explaining example configurations disclosed herein. As shown in this example, the computer system 210 includes an interconnection mechanism 211 such as a data bus or other circuitry that couples a memory system 212, a processor 213, an input/output interface 214, and a communications interface 215. The communications interface 215 enables the computer system 210 to communicate with other devices (i.e., other computers) on a network (not shown).

The memory system 212 is any type of computer readable medium, and in this example, is encoded with a unicast advertisement conflict resolution operating application 240-1 as explained herein. The unicast advertisement conflict resolution operating application 240-1 may be embodied as software code such as data and/or logic instructions (e.g., code stored in the memory or on another computer readable medium such as a removable disk) that supports processing functionality according to different embodiments described herein. During operation of the computer system 210, the processor 213 accesses the memory system 212 via the interconnect 211 in order to launch, run, execute, interpret or otherwise perform the logic instructions of a unicast advertisement conflict resolution operating application 240-1. Execution of a unicast advertisement conflict resolution operating application 240-1 in this manner produces processing functionality in the unicast advertisement conflict resolution operating process 240-2. In other words, the unicast advertisement conflict resolution operating process 240-2 represents one or more portions or runtime instances of a unicast advertisement conflict resolution operating application 240-1 (or the entire a unicast advertisement conflict resolution operating application 240-1) performing or executing within or upon the processor 213 in the computerized device 210 at runtime.

It is noted that example configurations disclosed herein include the unicast advertisement conflict resolution operating application 240-1 itself (i.e., in the form of un-executed or non-performing logic instructions and/or data). The unicast advertisement conflict resolution operating application 240-1 may be stored on a computer readable medium (such as a floppy disk), hard disk, electronic, magnetic, optical, or other computer readable medium. A unicast advertisement conflict resolution operating application 240-1 may also be stored in a memory system 212 such as in firmware, read only memory (ROM), or, as in this example, as executable code in, for example, Random Access Memory (RAM). In addition to these embodiments, it should also be noted that other embodiments herein include the execution of a unicast advertisement conflict resolution operating application 240-1 in the processor 213 as the unicast advertisement conflict resolution operating process 240-2. Those skilled in the art will understand that the computer system 210 may include other processes and/or software and hardware components, such as an operating system not shown in this example.

During operation, processor 213 of computer system 200 accesses memory system 212 via the interconnect 211 in order to launch, run, execute, interpret or otherwise perform the logic instructions of the unicast advertisement conflict resolution application 240-1. Execution of unicast advertisement conflict resolution application 240-1 produces processing functionality in unicast advertisement conflict resolution process 240-2. In other words, the unicast advertisement conflict resolution process 240-2 represents one or more portions of the unicast advertisement conflict resolution application 240-1 (or the entire application) performing within or upon the processor 213 in the computer system 200.

It should be noted that, in addition to the unicast advertisement conflict resolution process 240-2, embodiments herein include the unicast advertisement conflict resolution application 240-1 itself (i.e., the un-executed or non-performing logic instructions and/or data). The unicast advertisement conflict resolution application 240-1 can be stored on a computer readable medium such as a floppy disk, hard disk, or optical medium. The unicast advertisement conflict resolution application 240-1 can also be stored in a memory type system such as in firmware, read only memory (ROM), or, as in this example, as executable code within the memory system 212 (e.g., within Random Access Memory or RAM).

In addition to these embodiments, it should also be noted that other embodiments herein include the execution of unicast advertisement conflict resolution application 240-1 in processor 213 as the unicast advertisement conflict resolution process 240-2. Those skilled in the art will understand that the computer system 200 can include other processes and/or software and hardware components, such as an operating system that controls allocation and use of hardware resources associated with the computer system 200.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A computer-implemented method comprising:
designating a particular Backbone Virtual Local Area Network (BVLAN) as a first BVLAN on a first network device in a transport network;
receiving, at said first network device, a first message from a second network device advertising a first Backbone Media Access Channel (BMAC) on said first BVLAN;
receiving, at said first network device, a second message from a third network device advertising said first BMAC on said first BVLAN;
detecting a conflict due to said first BMAC on said first BVLAN being advertised by said second network device and said third network device;
recognizing that said particular BVLAN is said first BVLAN; and
assigning said first BMAC on said first BVLAN to the device of said second network device and said third network device having a lower Identifier (ID) value on said first BVLAN.

2. The method of claim 1 further comprising:
designating a second particular BVLAN as a second BVLAN fon said first network device;

receiving, at said first network device, a third message from a fourth network device advertising said second BMAC on said second BVLAN;

receiving, at said first network device, a fourth message from a fifth network device advertising said second BMAC on said second BVLAN;

detecting a conflict due to said second BMAC on said second BVLAN being advertised by said fourth network device and said fifth network device;

recognizing that said second particular BVLAN is said second BVLAN; and assigning said second BMAC on said second BVLAN to the device of said fourth network device and said fifth network device having a higher Identifier (ID) value on said second BVLAN.

3. The method of claim 2 wherein said ID value comprises one of the group comprising an Intermediate System to Intermediate System (ISIS) system ID and a Shortest Path Bridging (SPB) bridge ID.

4. The method of claim 2 wherein said transport network comprises a Shortest Path Bridging (SPB) network.

5. The method of claim 1 wherein said second network device and said third network device comprises a dual homed pair of devices and wherein said first BMAC comprises a Virtual BMAC (VBMAC1).

6. The method of claim 5 further comprising one of said second network device and said third network device failing.

7. The method of claim 6 further comprising assigning said VBMAC to the non-failing one of said second network device and said third network device.

8. The method of claim 7 further comprising the failed one of said second network device and said third network device recovering.

9. The method of claim 8 further comprising, after the failed one of said second network device and said third network device recovers, assigning said first BMAC on said first BVLAN to the device of said second network device and said third network device having a lower Identifier (ID) value on said first BVLAN.

10. A non-transitory computer readable storage medium having computer readable code thereon for resolving conflicting unicast advertisements in a network, the medium including instructions in which a computer system performs operations comprising:

designating a particular Backbone Virtual Local Area Network (BVLAN) as a first BVLAN on a first network device in a transport network;

receiving, at said first network device, a first message from a second network device advertising a first Backbone Media Access Channel (BMAC) on said first BVLAN;

receiving, at said first network device, a second message from a third network device advertising said first BMAC on said first BVLAN;

detecting a conflict due to said first BMAC on said first BVLAN being advertised by said second network device and said third network device;

recognizing that said particular BVLAN is said first BVLAN; and assigning said first BMAC on said first BVLAN to the device of said second network device and said third network device having a lower Identifier (ID) value on said first BVLAN.

11. The computer readable storage medium of claim 10 further comprising instructions for:

designating a second particular BVLAN as a second BVLAN on said first network device;

receiving, at said first network device, a third message from a fourth network device advertising said second BMAC on said second BVLAN;

receiving, at said first network device, a fourth message from a fifth network device advertising said second BMAC on said second BVLAN;

detecting a conflict due to said second BMAC on said second BVLAN being advertised by said fourth network device and said fifth network device;

recognizing that said second particular BVLAN is said second BVLAN; and assigning said second BMAC on said second BVLAN to the device of said fourth network device and said fifth network device having a higher Identifier (ID) value on said second BVLAN.

12. The computer readable storage medium of claim 11 further comprising instructions wherein said ID value comprises one of the group comprising an Intermediate System to Intermediate System (ISIS) system ID and a Shortest Path Bridging (SPB) bridge ID.

13. The computer readable storage medium of claim 11 further comprising instructions wherein said transport network comprises a Shortest Path Bridging (SPB) network.

14. The computer readable storage medium of claim 10 further comprising instructions wherein said second network device and said third network device comprises a dual homed pair of devices and wherein said BMAC1 comprises a Virtual BMAC (VBMAC1).

15. The computer readable storage medium of claim 14 further comprising one of said second network device and said third network device failing.

16. The computer readable storage medium of claim 15 further comprising instructions for assigning said VBMAC to the non-failing one of said second network device and said third network device.

17. The computer readable storage medium of claim 16 further comprising instructions for the failed one of said second network device and said third network device recovering.

18. The computer readable storage medium of claim 17 further comprising instructions for after the failed one of said second network device and said third network device recovers, assigning said first BMAC on said first BVLAN to the device of said second network device and said third network device having a lower Identifier (ID) value.

19. A computer system comprising:
a memory;
a processor;
a communications interface;
an interconnection mechanism coupling the memory, the processor and the communications interface; and
wherein the memory is encoded with an application for resolving conflicting unicast advertisements in a Shortest Path Bridging (SPB) Network, that when performed on the processor, provides a process for processing information, the process causing the computer system to perform the operations of:

designating a particular Backbone Virtual Local Area Network (BVLAN) as a first BVLAN on a first network device in a transport network;

receiving, at said first network device, a first message from a second network device advertising a first Backbone Media Access Channel (BMAC) on said first BVLAN;

receiving, at said first network device, a second message from a third network device advertising said first BMAC on said first BVLAN;

detecting a conflict due to said first BMAC on said first BVLAN being advertised by said second network device and said third network device;
recognizing that said particular BVLAN is said first BVLAN; and
assigning said first BMAC on said first BVLAN to the device of said second network device and said third network device having a lower Identifier (ID) value on said first BVLAN.

20. The computer system of claim 19 further comprising:
designating a second particular BVLAN as a second BVLAN (on said first network device;
receiving, at said first network device, a third message from a fourth network device advertising said second BMAC on said second BVLAN;
receiving, at said first network device, a fourth message from a fifth network device advertising said second BMAC on said second BVLAN;
detecting a conflict due to said second BMAC on said second BVLAN being advertised by said fourth network device and said fifth network device;
recognizing that said second particular BVLAN is said second BVLAN; and
assigning said second BMAC on said second BVLAN to the device of said fourth network device and said fifth network device having a higher Identifier (ID) value on said second BVLAN.

\* \* \* \* \*